(12) United States Patent
Yang et al.

(10) Patent No.: US 10,601,788 B2
(45) Date of Patent: Mar. 24, 2020

(54) INTERCEPTION OF SECURE SHELL COMMUNICATION SESSIONS

(71) Applicant: A10 Networks, Inc., San Jose, CA (US)

(72) Inventors: Yang Yang, San Jose, CA (US); Stephen Bafico, San Jose, CA (US); Xuyang Jiang, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 203 days.

(21) Appl. No.: 15/473,360

(22) Filed: Mar. 29, 2017

(65) Prior Publication Data

US 2018/0288009 A1 Oct. 4, 2018

(51) Int. Cl.
*H04L 29/06* (2006.01)

(52) U.S. Cl.
CPC .......... *H04L 63/0428* (2013.01); *H04L 63/06* (2013.01)

(58) Field of Classification Search
CPC . H04L 63/04; H04L 63/0428; H04L 63/0464; H04L 63/0478; H04L 63/105; H04L 63/108; H04L 63/20; H04L 63/205; H04L 63/306; H04L 63/06
See application file for complete search history.

(56) References Cited

U.S. PATENT DOCUMENTS

| | | | |
|---|---|---|---|
| 2006/0095969 A1* | 5/2006 | Portolani | H04L 63/0254 726/23 |
| 2011/0264905 A1* | 10/2011 | Ovsiannikov | H04L 29/08792 713/151 |
| 2016/0277372 A1* | 9/2016 | Shah | H04L 63/061 |
| 2017/0289104 A1* | 10/2017 | Shankar | H04L 63/029 |
| 2017/0331800 A1* | 11/2017 | Wood | G06F 9/442 |
| 2018/0124198 A1* | 5/2018 | Petrov | H04L 67/2814 |

\* cited by examiner

*Primary Examiner* — Joseph P Hirl
*Assistant Examiner* — Chi S Nguy
(74) *Attorney, Agent, or Firm* — Keith Kline; The Kline Law Firm PC

(57) ABSTRACT

Provided are a method and a system for intercepting secure shell (SSH) sessions. The method may commence with intercepting, by a client-facing SSH gateway, a session request to establish an SSH session between a client and a server. The method may continue with establishing a first SSH session between the client and the client-facing SSH gateway and receiving encrypted data packets of the SSH session from the client via the first SSH session. The client-facing SSH gateway may decrypt the encrypted data packets, establish a communication session with a server-facing SSH gateway, and forward decrypted data packets to the server-facing SSH gateway via the communication session. The server-facing SSH gateway may receive the decrypted data packets, establish a second SSH session between the server-facing SSH gateway and the server, encrypt the decrypted data packets, and forward the encrypted data packets to the server via the second SSH session.

18 Claims, 13 Drawing Sheets

INTERCEPTION OF SECURE SHELL COMMUNICATION SESSIONS

TECHNICAL FIELD

This invention relates generally to data network and more particularly to interception of secure shell (SSH) communication sessions.

BACKGROUND

Security is an important aspect of network applications. Secure network applications rely on a secure communication session between a client application running on a client device and a server application running on a server device. Many secure network applications use SSH communication sessions between client applications and server applications. An SSH is a cryptographic network protocol conventionally used for operating network services securely over an unsecured network. SSH-based network applications may be used to allow a user to access a remote desktop device as if the user is using the remote desktop device as a local desktop, to transfer documents and files between a user device and a remote server, to remotely execute a server application, which may be different from the server network application, or to access other computing devices via the server network application. The usage of secure network applications may pose a threat to data networks or resources associated with the remote server, or a threat to the local data network or resources associated with the client, or may violate a company policy regarding usage of local or remote computing devices or resources.

Corporations conventionally establish security policies to oversee transfer of documents and files between users of a corporation and an outside network such as the Internet. However, as data packets sent via secure communication sessions using the SSH-based network applications are encrypted, examination and inspection of the secure communication sessions for enforcement of security policies may be difficult or impossible.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for intercepting SSH sessions. According to one approach of the present disclosure, a system for intercepting SSH sessions is provided. Specifically, the system for intercepting SSH sessions may include a client-facing SSH gateway and a server-facing SSH gateway. The client-facing SSH gateway may be configured to intercept a session request of a client. The session request may include a request to establish an SSH session between the client and a server. The session request may include at least a server network address associated with the server. The client-facing SSH gateway may be further configured to establish a first SSH session between the client and the client-facing SSH gateway based on the session request. Upon establishing the first SSH session, the client-facing SSH gateway may receive, via the first SSH session, one or more data packets associated with the SSH session from the client. The one or more data packets may be one or more encrypted data packets. The client-facing SSH gateway may be further configured to decrypt the one or more encrypted data packets to obtain one or more decrypted data packets. Based on the server network address comprised in the session request, the client-facing SSH gateway may establish a communication session between the client-facing SSH gateway and a server-facing SSH gateway. The client-facing SSH gateway may forward the one or more decrypted data packets to the server-facing SSH gateway via the communication session. Upon establishing the communication session with the client-facing SSH gateway, the server-facing SSH gateway may establish a second SSH session between the server-facing SSH gateway and the server. The second SSH session may be established based on the server network address. The server-facing SSH gateway may be further configured to receive the one or more decrypted data packets from the client-facing SSH gateway via the communication session. The server-facing SSH gateway may encrypt the one or more decrypted data packets to obtain the one or more encrypted data packets and forward the one or more encrypted data packets to the server via the second SSH session.

According to another approach of the present disclosure, a method for intercepting SSH sessions is provided. The method may commence with intercepting, by a client-facing SSH gateway, a session request of a client. The session request may include a request to establish an SSH session between the client and a server. The session request may include at least a server network address associated with the server. The method may continue with establishing, by the client-facing SSH gateway, a first SSH session between the client and the client-facing SSH gateway based on the session request. The method may further include receiving, by the client-facing SSH gateway, one or more data packets associated with the SSH session from the client via the first SSH session. The one or more data packets may be one or more encrypted data packets. The client-facing SSH gateway may decrypt the one or more encrypted data packets to obtain one or more decrypted data packets. The method may further include establishing, by the client-facing SSH gateway, a communication session between the client-facing SSH gateway and a server-facing SSH gateway. The communication session may be established based on the server network address comprised in the session request. The method may continue with forwarding, by the client-facing SSH gateway, the one or more decrypted data packets to the server-facing SSH gateway via the communication session. Upon establishing the communication session, the server-facing SSH gateway may establish a second SSH session between the server-facing SSH gateway and the server based on the server network address. The method may further include receiving, by the server-facing SSH gateway, the one or more decrypted data packets from the client-facing SSH gateway via the communication session, encrypting the one or more decrypted data packets to obtain the one or more encrypted data packets, and forwarding the one or more encrypted data packets to the server via the second SSH session.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
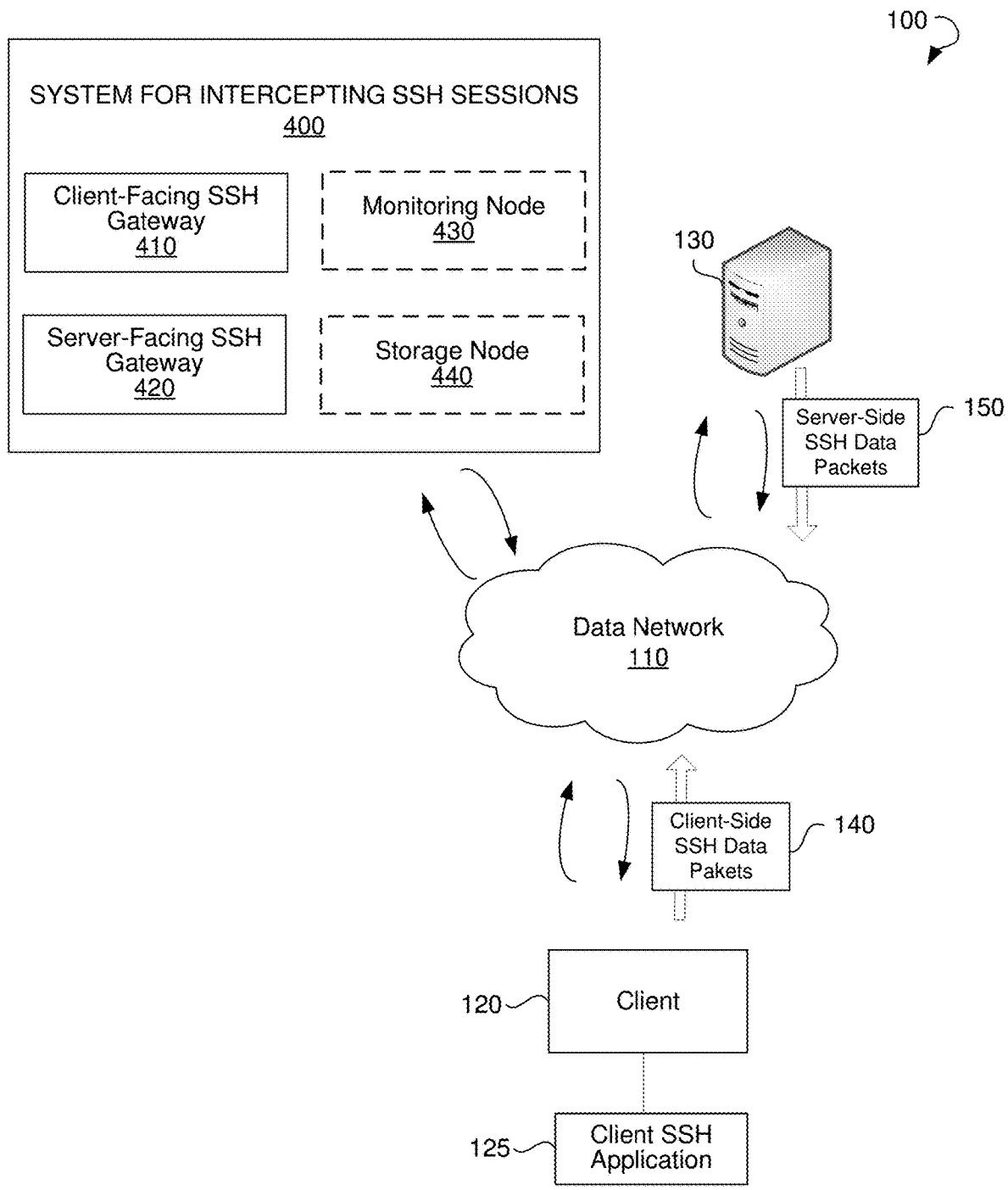
FIG. 1 shows an environment, within which methods and systems for intercepting SSH sessions can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to intercepting SSH sessions by SSH gateways. Monitoring security appliances, security policy appliances, and similar devices or systems may be located between a client and a server to inspect data traffic flowing between the client and the server. The monitoring security appliances and security policy appliances may be unable to inspect encrypted data traffic. Therefore, the data traffic received from the client may be decrypted, sent to the monitoring security appliances and security policy appliances for inspection, and decrypted for sending to the server. More specifically, two SSH gateways may be located between the client and the server for intercepting the encrypted data traffic sent by the client, decrypting the data traffic, sending the decrypted data traffic for inspection, encrypting the decrypted data traffic, and forwarding the encrypted data traffic to the server. The two SSH gateways may include a client-facing SSH gateway and a server-facing SSH gateway.

More specifically, the client may initiate establishment of an SSH session with a server by sending a session request. The client-facing SSH gateway may intercept the session request sent by the client. Based on the session request, the client-facing SSH may perform a handshake procedure with the client to establish a first SSH session between the client and the client-facing SSH. Upon establishing the first SSH session with the client, the client-facing SSH may wait for a first data packet associated with the SSH session (i.e., a first encrypted data packet of the SSH session) from the client. The client may send the first data packet via the first SSH session. Upon receipt of the first data packet associated with the SSH session, the client-facing SSH gateway may establish a communication session, such as a transmission control protocol (TCP) communication session, with the server-facing SSH gateway. More specifically, the client-facing SSH gateway may establish the TCP communication session between the client-facing SSH gateway and the server-facing SSH gateway based on a server network address comprised in the session request received from the client. After the TCP communication session between the client-facing SSH gateway and the server-facing SSH gateway is established, the server-facing SSH gateway may establish a second SSH session between the server-facing SSH gateway and the server. More specifically, the server-facing SSH gateway may establish the second SSH session based on the server network address.

The client-facing SSH gateway may decrypt the first data packet associated with the SSH session received from the client. Optionally, the client-facing SSH gateway may forward the decrypted data packet to a monitoring node (e.g., for inspection for compliance with security policies). After the inspection, the monitoring node may forward the decrypted data packet back to the client-facing SSH gateway or directly to the server-facing SSH gateway.

The client-facing SSH gateway may forward the decrypted data packet to the server-facing SSH gateway via the TCP communication session. The server-facing SSH gateway may receive the decrypted data packet and encrypt the decrypted data packet to obtain the first data packet. The server-facing SSH gateway may forward the first data packet to the server via the second SSH session. All further data packets of the client may be sent to the server in the same way via the first SSH session, the TCP communication session, and the second SSH session.

Data packets of the SSH session sent by the server may be processed in a similar way. More specifically, the server-facing SSH gateway may intercept encrypted data packets of the SSH session sent by the server via the second SSH session. The server-facing SSH gateway may decrypt the encrypted data packets, optionally provide the decrypted data packets to the monitoring node, and forward the decrypted data packets to the client-facing SSH gateway via the TCP communication session. The client-facing SSH gateway may receive the decrypted data packets, encrypt the decrypted data packets to obtain the encrypted data packets, and forward the encrypted data packets to the client via the first SSH session.

Therefore, the SSH session between the client and the server may be provided using the first SSH session between the client and the client-facing SSH gateway, the TCP communication session between the client-facing SSH gateway and the server-facing SSH gateway, and the second SSH session between the server-facing SSH gateway and the server.

Referring now to the drawings, FIG. 1 illustrates an environment 100 within which methods and systems for intercepting SSH sessions can be implemented. The environment 100 may include a data network 110 (e.g., a computing cloud), a client 120, a server 130, and a system 400 for intercepting SSH sessions (also referred to as a system 400). The client 120 may include a personal computer (PC), a laptop, a smartphone, a tablet PC, a television set, a mobile phone, an Internet phone, a netbook, a home gateway, a broadband gateway, a network appliance, a set top box, a media server, a personal media player, an access gateway, a networking switch, a server computer, a network storage computer, and so forth. A client SSH application 125 may be running on the client 120. The client SSH application 125 may include an application that uses an SSH cryptographic network protocol for communication sessions over the data network 110. The client 120, the server 130, and the system 400 may be connected to the data network 110.

The data network 110 may not be limited to the computing cloud but may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes, that may be interconnected for the purpose of data communication.

The system 400 may include a client-facing SSH gateway 410, a server-facing SSH gateway 420, and optionally a monitoring node 430 and a storage node 440. The client-facing SSH gateway 410 and the server-facing SSH gateway 420 may be configured to intercept client-side SSH data packets 140 and server-side SSH data packets 150 sent between the client 120 and the server 130. The client-side SSH data packets 140 may be associated with the client SSH application 125 running on the client 120. The client-side SSH data packets 140 and server-side SSH data packets 150 may be processed by the client-facing SSH gateway 410, the server-facing SSH gateway 420, and the monitoring node 430 of the system 400.

Figure 2:
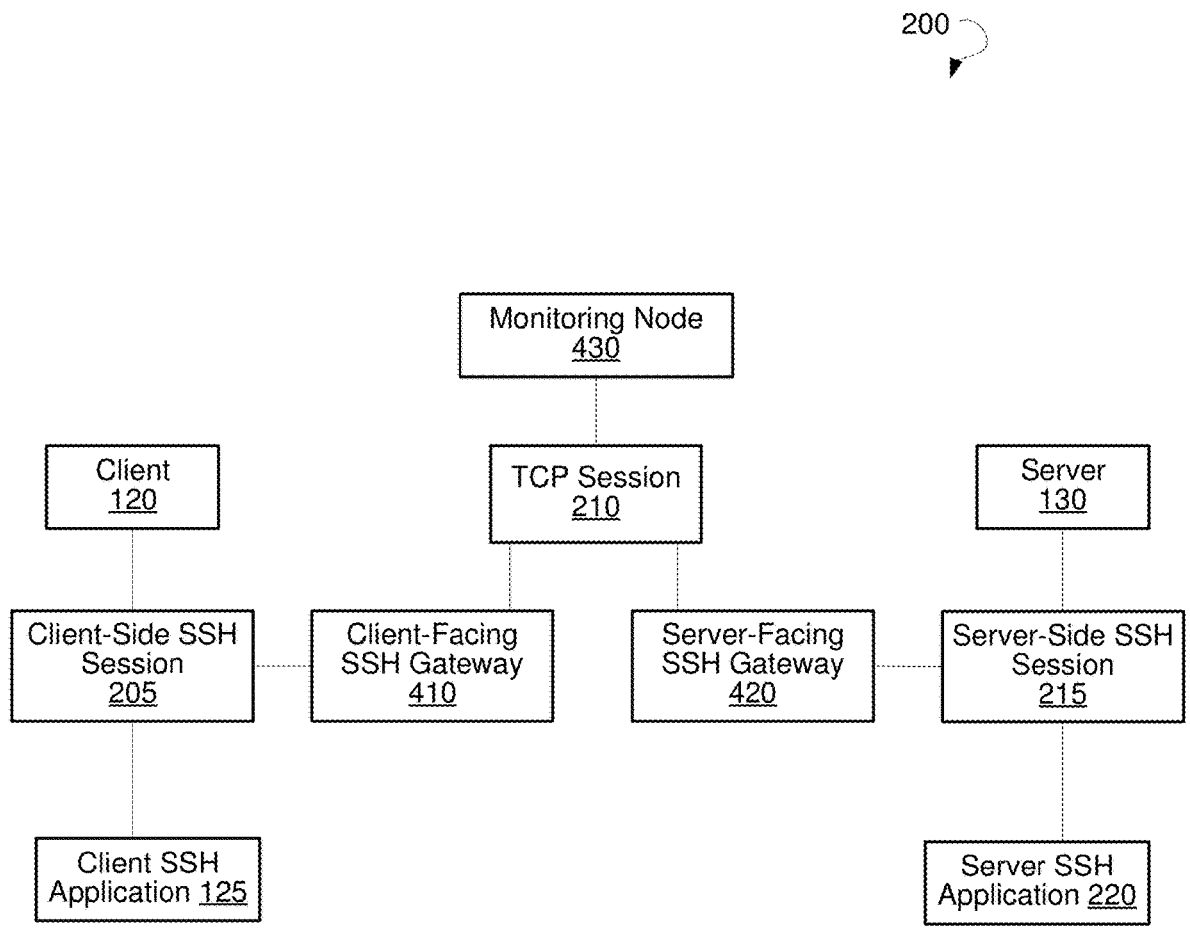
FIG. 2 illustrates intercepting an SSH session between a client and a server using SSH gateways.

FIG. 2 is a block diagram 200 showing intercepting an SSH session between a client and a server using SSH gateways, according to an example embodiment. A client 120 may have a client SSH application 125 installed or running on the client 120. The SSH application may initiate establishing an SSH session between the client 120 and a server 130. A client-facing SSH gateway 410 may intercept all data packets associated with the client SSH application 125 and sent by the client 120 to the server 130. Based on information received from the client 120 in data packets (e.g., in a request to establish the SSH session), the client-facing SSH gateway 410 may establish a first SSH session shown as a client-side SSH session 205.

Upon establishing the client-side SSH session 205, the client-facing SSH gateway 410 may further establish a TCP session 210 with a server-facing SSH gateway 420. The client-facing SSH gateway 410 may forward the data packets received from the client 120 to the server-facing SSH gateway 420 via the TCP session 210. Additionally, the client-facing SSH gateway 410 may forward the data packets received from the client 120 to a monitoring node 430.

Upon receipt of the data packets from the client-facing SSH gateway 410 via the TCP session 210, the server-facing SSH gateway 420 may establish a second SSH session shown as a server-side SSH session 215 between the server-facing SSH gateway 420 and the server 130. A server SSH application 220 may be running on the server 130 and may process the data packets of the SSH session and initiate sending data packets associated with the SSH session by the server 130 to the client 120.

Figure 3:
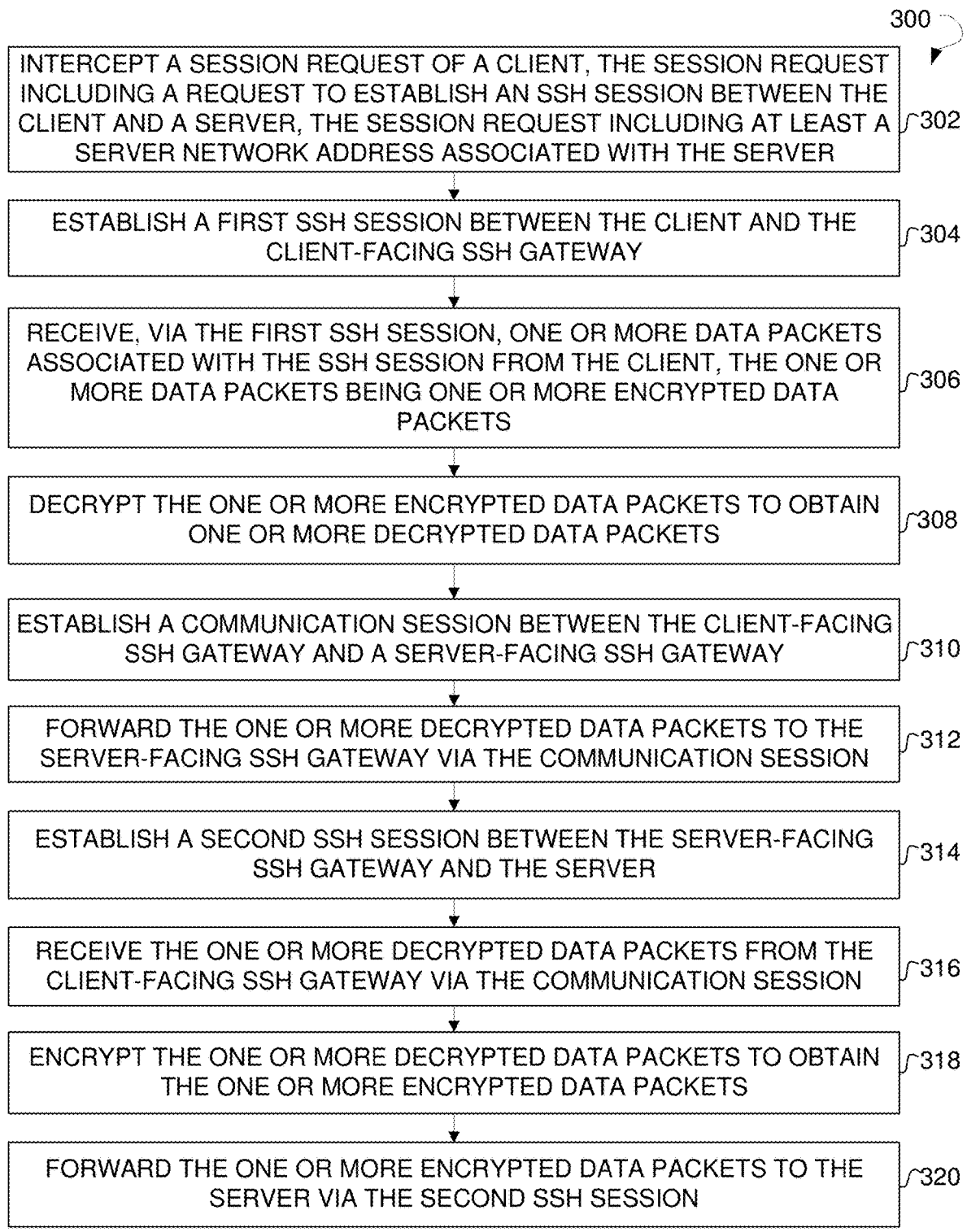
FIG. 3 shows a process flow diagram of a method for intercepting SSH sessions.

FIG. 3 shows a process flow diagram of a method 300 for intercepting SSH sessions, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with intercepting a session request sent by a client at operation 302. The session request may include a request to establish an SSH session between the client and a server. The session request may be intercepted by a client-facing SSH gateway. The client-facing SSH gateway may analyze the session request and determine that the session request includes at least a server network address associated with the server. In an example embodiment, the interception of the session request may be performed by the client-facing SSH gateway based on a security policy. The security policy may include one or more filters for inspecting the session request. The one or more filters may include one or more of the following: the server network address, a client network address, an SSH port number associated with the client, a TCP port number associated with the client, a link layer network address, and so forth.

The method 300 may continue with establishing, by the client-facing SSH gateway, a first SSH session between the client and the client-facing SSH gateway at operation 304. The first SSH session may be established based on the session request. At operation 306, the client-facing SSH gateway may receive, via the first SSH session, one or more data packets associated with the SSH session from the client. The one or more data packets may be one or more encrypted data packets. The method 300 may continue with decrypting, by the client-facing SSH gateway, the one or more encrypted data packets at operation 308. Based on the decryption, one or more decrypted data packets may be obtained.

At operation 310, the client-facing SSH gateway may establish a communication session between the client-facing SSH gateway and a server-facing SSH gateway. The communication session may be established based on the server network address comprised in the session request. In an example embodiment, the communication session between the client-facing SSH gateway and the server-facing SSH gateway may include a secure TCP session or an unsecure TCP session.

Optionally, method 300 may further include forwarding, by the client-facing SSH gateway, the one or more decrypted data packets to a monitoring node. The monitoring node may inspect the one or more decrypted data packets and forward the inspected one or more decrypted data packets to the client-facing SSH gateway or to the server-facing SSH gateway. In an example embodiment, the monitoring node may be configured to perform one or more actions with regard to the one or more decrypted data packets, such as inspecting the one or more decrypted data packets, applying a security policy to the one or more decrypted data packets, dropping at least one of the one or more decrypted data packets, replacing a data content in the one or more decrypted data packets, storing the one or more decrypted data packets, generating a report associated with inspecting the one or more decrypted data packets, and so forth.

The method 300 may further include forwarding, by the client-facing SSH gateway, the one or more decrypted data packets to the server-facing SSH gateway via the communication session at operation 312. At operation 314, upon establishing the communication session, the server-facing SSH gateway may establish a second SSH session between the server-facing SSH gateway and the server. The second SSH session may be established based on the server network address.

The method 300 may continue with receiving, by the server-facing SSH gateway, the one or more decrypted data packets from the client-facing SSH gateway via the communication session at operation 316. Optionally, the client-facing SSH gateway may forward the one or more decrypted data packets to the monitoring node, and the server-facing SSH gateway may receive the one or more decrypted data packets directly from the monitoring node.

At operation 318, the server-facing SSH gateway may encrypt the one or more decrypted data packets to obtain the one or more encrypted data packets. The method 300 may further include forwarding, by the server-facing SSH gateway, the one or more encrypted data packets to the server via the second SSH session at operation 320.

Therefore, the SSH session between the client and the server may include the first SSH session between the client and the client-facing SSH gateway, the communication session between the client-facing SSH gateway and the server-facing SSH gateway, and the second SSH session between the server-facing SSH gateway and the server.

In an example embodiment, the method 300 may further include receiving, by the server-facing SSH gateway, one or more further data packets associated with the SSH session from the server. The one or more further data packets may be received via the second SSH session. The server-facing SSH gateway may decrypt the one or more further encrypted data packets to obtain one or more further decrypted data packets. The method 300 may further include forwarding, by the server-facing SSH gateway, the one or more further decrypted data packets to the client-facing SSH gateway via the communication session. Optionally, the server-facing SSH gateway may forward the one or more further decrypted data packets to the monitoring node for inspection.

The client-facing SSH gateway may receive the one or more further decrypted data packets from the server-facing SSH gateway via the communication session or from the monitoring node in case of sending the one or more further decrypted data packets to the monitoring node by the server-facing SSH gateway. The client-facing SSH gateway may encrypt the one or more further decrypted data packets to obtain the one or more further encrypted data packets. The method 300 may further include forwarding, by the client-facing SSH gateway, the one or more further encrypted data packets to the client via the first SSH session.

In an example embodiment, the method 300 may further include generating, by the client-facing SSH gateway, a client-side security key for the SSH session. The client-side security key may be generated based on the session request and in response to the receipt of the session request. The client-facing SSH gateway may provide the client-side security key to the client. The one or more encrypted data packets may be encrypted by the client using the client-side security key. Furthermore, the one or more encrypted data packets may be decrypted by the client-facing SSH gateway using the client-side security key.

In a further example embodiment, the method 300 may include receiving, by the client-facing SSH gateway, a rekey message from the client. The rekey message may include a request to generate a further client-side security key. Responsive to the receipt of the rekey message, the client-facing SSH gateway may generate the further client-side security key. The client-facing SSH gateway may send the further client-side security key to the client. All further encrypted data packets received from the client may be decrypted by the client-facing SSH gateway using the further client-side security key.

The method 300 may further include generating, by the server-facing SSH gateway, a server-side security key for the SSH session. The server-facing SSH gateway may generate the server-side security key based on the session request. The server-facing SSH gateway may provide the server-side security key to the server. The one or more decrypted data packets may be encrypted by the server-facing SSH gateway using the server-side security key and may be decrypted by the server using the server-side security key.

In a further example embodiment, the server-facing SSH gateway may receive a further rekey message from the server. The further rekey message may include a request to generate a further server-side security key. Responsive to the receipt of the further rekey message, the client-facing SSH gateway may generate the further server-side security key. The client-facing SSH gateway may send the further server-side security key to the server. All further encrypted data packets received from the server may be decrypted by the server-facing SSH gateway using the further server-side security key.

Figure 4:
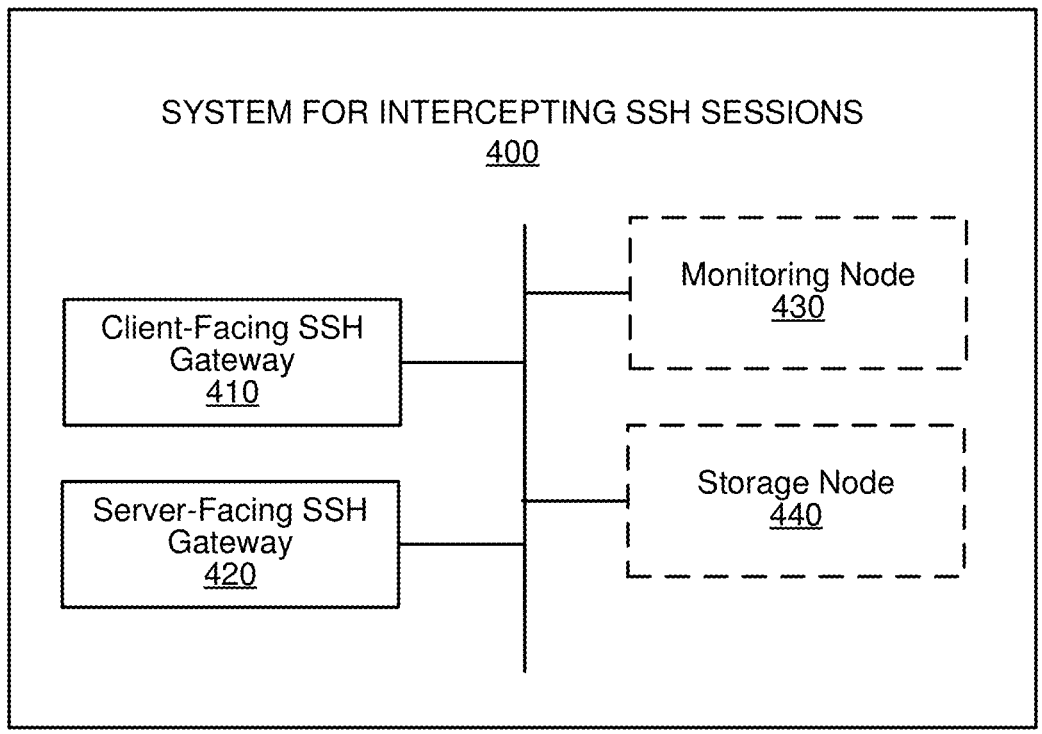
FIG. 4 shows a block diagram illustrating various modules of a system for intercepting SSH sessions.

FIG. 4 shows a block diagram illustrating various modules of a system 400 for intercepting SSH sessions, according to an example embodiment. Specifically, the system 400 may include a client-facing SSH gateway 410, a server-facing SSH gateway 420, and optionally a monitoring node 430 and a storage node 440. The operations, which the client-facing SSH gateway 410, the server-facing SSH gateway 420, and the monitoring node 430 are configured to perform, are described below with reference to FIGS. 5-12. The storage node 440 may be configured to store a server network address associated with a server and provided in a session request, client-side security keys and server-side security keys for an SSH session, and any other data needed for establishing the communication between the client, the client-facing SSH gateway 410, the server-facing SSH gateway 420, and the server.

Figure 5:
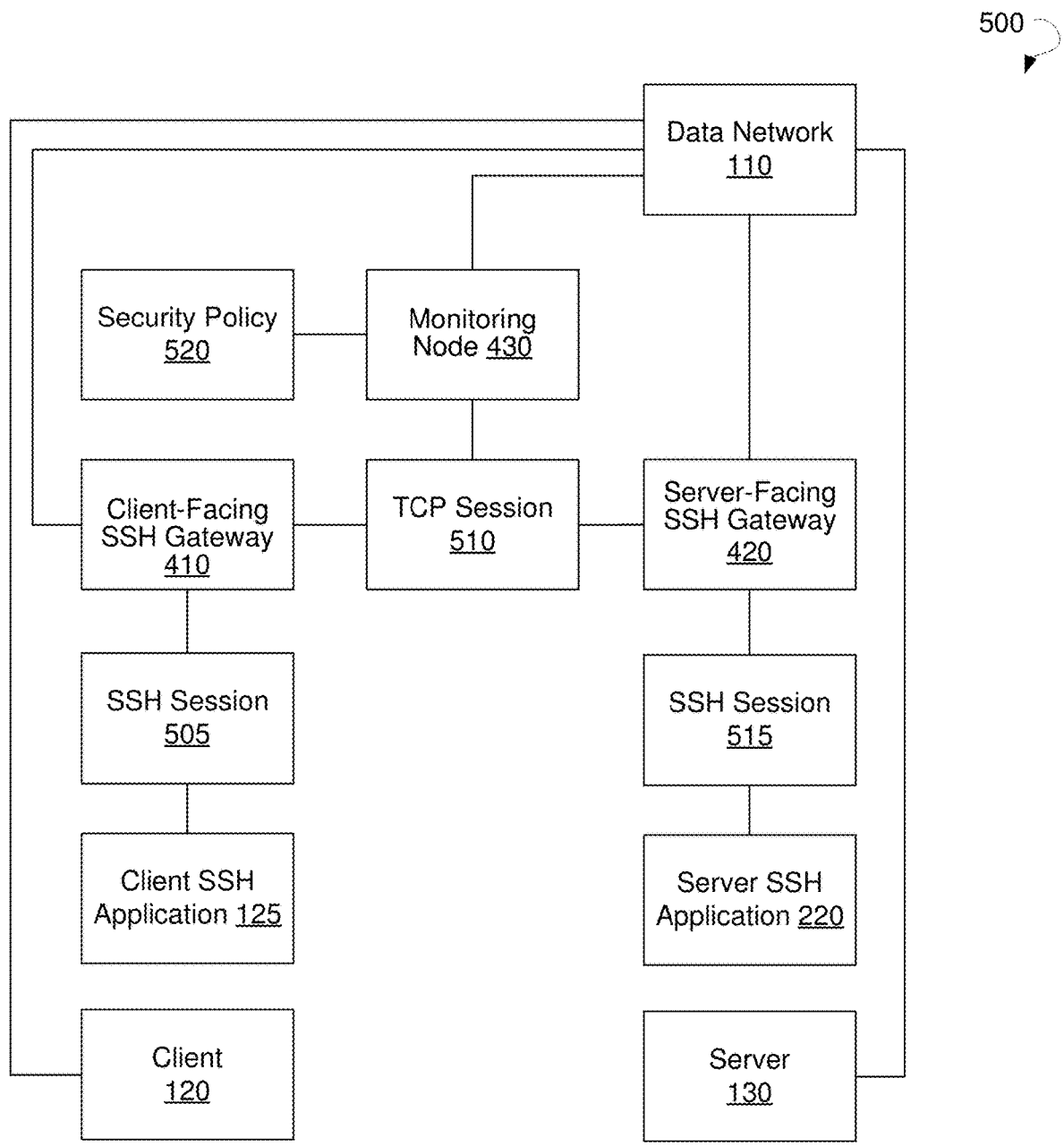
FIG. 5 is a block diagram illustrating intercepting an SSH session between a client and a server.

FIG. 5 is a block diagram 500 illustrating intercepting an SSH session between a client and a server, according to an example embodiment. In an example embodiment, a client 120 may have a client SSH application 125 installed or running on the client 120. The client SSH application 125 may initiate establishing an SSH session over a data network 110 towards a server SSH application 220 residing on a server 130. The client-facing SSH gateway 410 may receive a request for the SSH session from the client 120. In response to the request, the client-facing SSH gateway 410 may establish an SSH session 505 with the client 120. Upon establishing the SSH session 505, the client-facing SSH gateway 410 may establish a TCP session 510 with a server-facing SSH gateway 420 via the data network 110 using information associated with the server 130 from the request sent by the client 120. In an example embodiment, the TCP session 510 may be an unsecure session and may be used to transmit unencrypted data. In a further example embodiment, the TCP session 510 may be a secure session and private or proprietary cryptographic keys may be used for encryption and decryption data transmitted via the TCP session 510. In some example embodiments, data in a form of a clear text may be sent over the TCP session 510. Upon receipt of the information associated with the server 130 from the TCP session 510, the server-facing SSH gateway 420 may establish an SSH session 515 with a server SSH application 220 residing on the server 130, via the data network 110.

In an example embodiment, a monitoring node 430 may monitor the data network 110 and receive data exchanged in the TCP session 510. The monitoring node 430 may inspect the received data from the TCP session 510 according to at least a security policy 520. The monitoring node 430 may be aware of the client SSH application 125 and/or the server SSH application 220 and may inspect the received data according to security policies associated with the client SSH application 125 and/or the server SSH application 220. In an example embodiment, the monitoring node 430 may generate a security report according to the security policy 520. Based on the security policy 520, the monitoring node 430 may instruct the client-facing SSH gateway 410 or the server-facing SSH gateway 420 to stop processing the SSH session 505 or the SSH session 515.

In an example embodiment, the SSH session 505 or the SSH session 515 may include a secure session to support an SSH-based application communication session, such as a remote login session, a telnet session, a file transfer session, a remote access session, a File Transfer Protocol (FTP) session, a remote shell session, a virtual private network access (VPN) session, a virtual network computing (VNC) session, a remote desktop session, or any server application supporting SSH protocol.

In an example embodiment, the client SSH application 125 may include a plurality of instructions which, when executed by the client 120, may perform the client-side protocol of one or more SSH applications such as a VNC client, a FTP client, a telnet client, a remote login client, a remote shell client, a remote desktop client, or a VPN client.

Similarly, in an example embodiment, the server SSH application 220 may include a plurality of instructions which, when executed by one or more processors of server 130, may perform the server-side protocol of one or more SSH applications, such as a VNC server, a FTP server, a telnet server, a remote login server, a remote shell server, a remote desktop server, or a VPN server.

Figure 6:
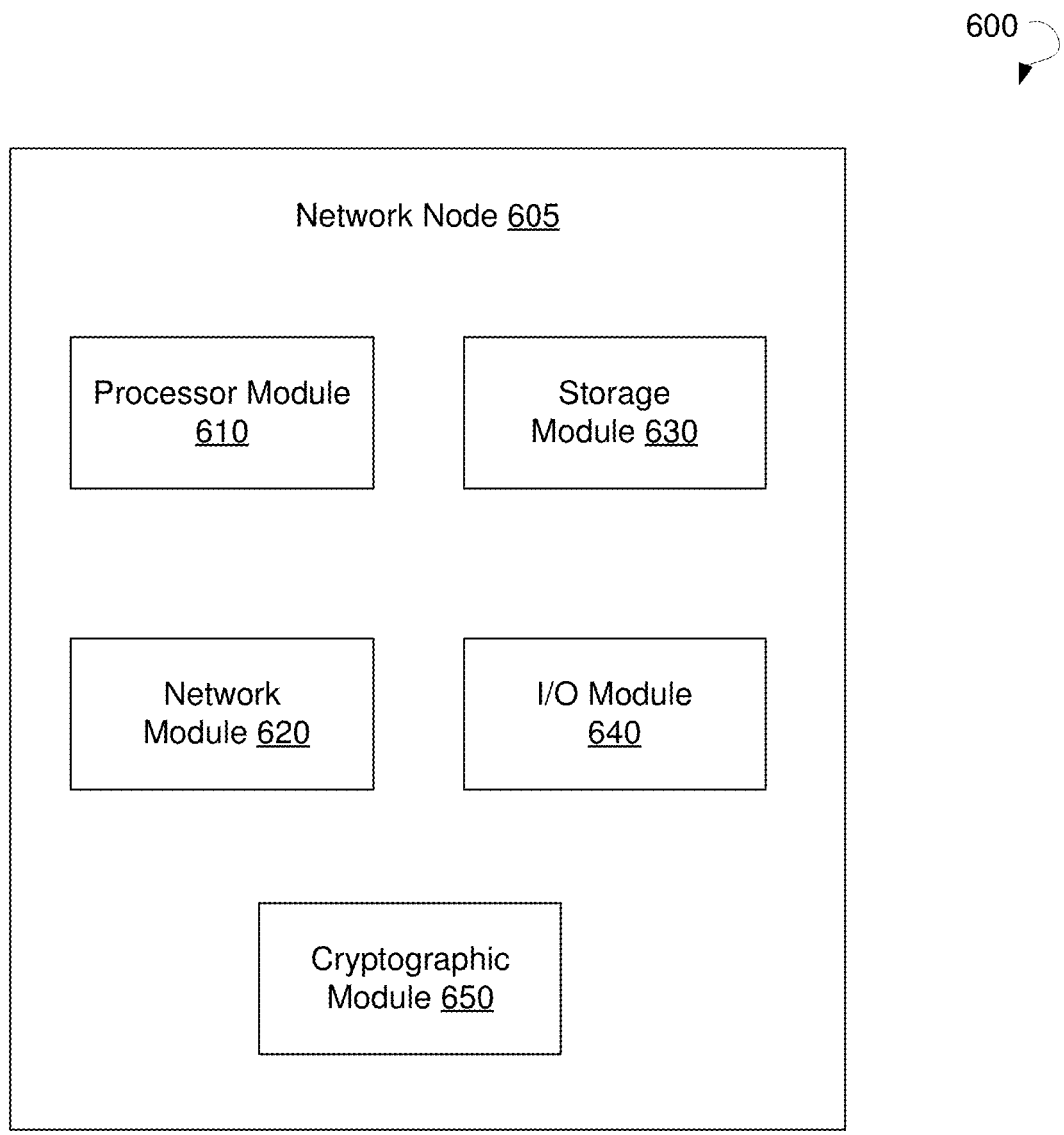
FIG. 6 is a block diagram illustrating a network node.

FIG. 6 is a block diagram 600 illustrating an example embodiment of a network node 605, according to an example embodiment. The network node 605 may include a network computer and may be configured as an SSH gateway, a client, or a server. In an example embodiment, the network node 605 may include a processor module 610, a network module 620, and a storage module 630. The processor module 610 may include one or more processors which may be a microprocessor, an Intel processor, an Advanced Micro Devices processor, a microprocessor without interlocked pipeline stages, an advanced restricted instruction set computer (RISC) machine-based processor, or a RISC processor. In an example embodiment, the processor module 610 may include one or more processor cores embedded in a processor. The processor module 610 may include one or more embedded processors, or embedded processing elements in a Field Programmable Gate Array, Application Specific Integrated Circuit, or Digital Signal Processor. In an example embodiment, the network module 620 may include a network interface such as Ethernet, optical network interface, a wireless network interface, T1/T3 interface, a WAN or LAN interface. In a further example embodiment, the network module 620 may include a network processor. In an example embodiment, the storage module 630 may include Random-access memory (RAM), Dynamic Random Access Memory, Static Random Access Memory, Double Data Rate Synchronous Dynamic Random Access Memory, or memory utilized by the processor module 610 or the network module 620. The storage module 630 may store data utilized by the processor module 610. The storage module 630 may include a hard disk drive, a solid state drive, an external disk, a Digital Versatile Disc (DVD), a compact disk (CD), or a readable external disk. The storage module 630 may store one or more computer programming instructions which when executed by the processor module 610 or the network module 620 may implement one or more of the functionality of the present disclosure. The network node 605 may include an input/output (I/O) module 640, which may include a keyboard, a keypad, a mouse, a gesture based input sensor, a microphone, a physical or sensory input peripheral, a display, a speaker, or a physical or sensual output peripheral. The network node 605 may include a cryptographic module 650, which may include one or more hardware-based cryptographic computing modules to perform data encryption and/or decryption.

Referring now to FIG. 5, in an example embodiment, each of the client 120, the server 130, the client-facing SSH gateway 410, and the server-facing SSH gateway 420 may be configured in a form of the network node 605 illustrated in FIG. 6. The client-facing SSH gateway 410 or the server-facing SSH gateway 420 may include a plurality of programming instructions which, when executed by one or more processors, may exchange data packets according to an SSH protocol. In an example embodiment, the client-facing SSH gateway 410 or the server-facing SSH gateway 420 may use a hardware-based cryptographic module, such as the cryptographic module 650 shown on FIG. 6, to process data encryption and data decryption. The client-facing SSH gateway 410 or the server-facing SSH gateway 420 may include one or more other network appliances or service gateway functionality such as traffic management, network address translation, firewall, Hypertext Transfer Protocol proxy, TCP proxy, service load balancing, or application delivery controller.

In an example embodiment, the monitoring node 430 may be configured in a form of network node 605 illustrated in FIG. 6. The monitoring node 430 may connect to the client-facing SSH gateway 410 and the server-facing SSH gateway 420 over the data network 110. The monitoring node 430 may include a network switch or router placed between the client-facing SSH gateway 410 and the server-facing SSH gateway 420. The monitoring node 430 may include a network appliance monitoring data traffic transmitted in the data network 110 between the client-facing SSH gateway 410 and the server-facing SSH gateway 420. The monitoring node 430 may include a plurality of instructions which, when executed by one or more processors of monitoring node 430, may inspect data traffic between the client-facing SSH gateway 410 and the server-facing SSH gateway 420 and apply the security policy 520 to the inspected data traffic.

In an example embodiment, the security policy 520 may include a filter, which may include one or more network addresses, a data pattern, a string of characters, a file name, a user identity, a folder name, a Uniform Resource Locator (URL), a regular expression, a content filter, a session filter, or a network filter. In a further example embodiment, the security policy 520 may include a behavior filter, which may include a connection count, a connection frequency, or other behavior based on previous inspected activities of the traffic of the client 120 and/or the server 130 using the client-facing SSH gateway 410 and/or the server-facing SSH gateway 420. The monitoring node 430 may include an action, which may include dropping data packets, recording data packet, replacing a data content in a data packet, sending a security report, or any other security action.

Figure 7:
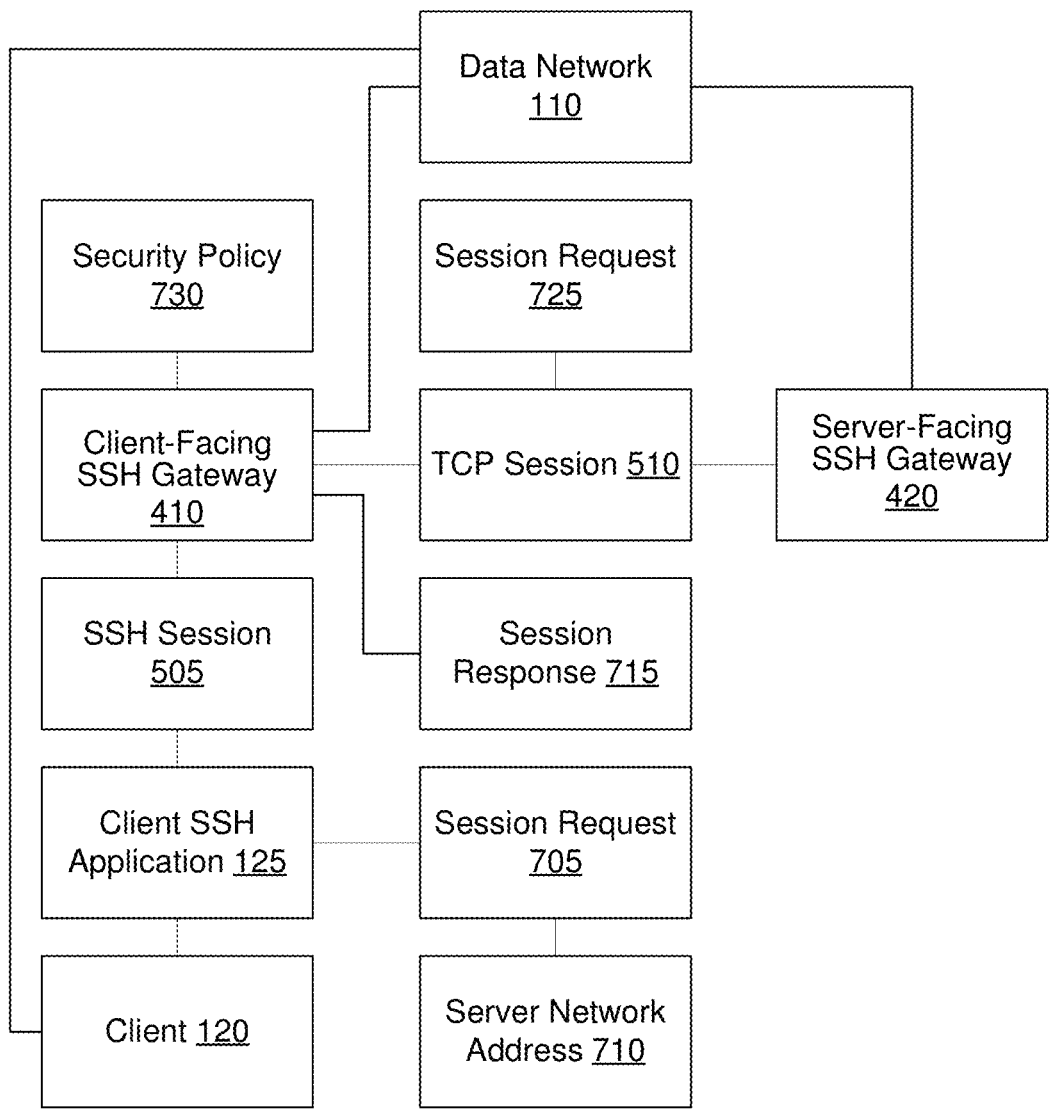
FIG. 7 is a block diagram illustrating establishing a client-side SSH session.

FIG. 7 is a block diagram 700 illustrating establishing a client-side SSH session, according to an example embodiment. A client SSH application 125 residing on the client 120 may send a session request 705 to establish an SSH session 505. The session request 705 may include a server network address 710. In an example embodiment, the server network address 710 may include an Internet Protocol (IP) address. The server network address 710 may also include a TCP port number or an SSH port number, such as 22, 443, or a pre-determined port number configured for a SSH protocol used by the client 120 and the client-facing SSH gateway 410.

The client 120 may send the session request 705 over the data network 110. The client-facing SSH gateway 410 may receive the session request 705 and retrieve the server network address 710 from the session request 705. Based on the server network address 710 in the session request 705, the client-facing SSH gateway 410 may determine that the SSH session 505 is required to be established. The client-facing SSH gateway 410 may store the server network address 710. The client-facing SSH gateway 410 may further send a session response 715 to the client 120 to establish the SSH session 505. In an example embodiment, upon receiving the session response 715, the client 120 may instruct the client SSH application 125 to complete an establishment of the SSH session 505.

The client-facing SSH gateway 410 may use the stored server network address 710 to send a request to establish a TCP session 510 with the server-facing SSH gateway 420. The client-facing SSH gateway 410 may use the server network address 710 as a destination network address for a session request 725. The client-facing SSH gateway 410 may select a source network address for the TCP session 510. The client-facing SSH gateway 410 may establish the TCP session 510 over the data network 110. In an example embodiment, the client-facing SSH gateway 410 may establish the TCP session 510 using a Virtual LAN (VLAN) of the Ethernet in the data network 110. In another example embodiment, the client-facing SSH gateway 410 may establish the TCP session 510 using a pre-stored VLAN identity.

The server-facing SSH gateway 420 may receive the session request 725 over the data network 110. The server-facing SSH gateway 420 may retrieve the server network address 710 from the session request 725. The server-facing SSH gateway 420 may process the session request 725 and determine that the TCP session 510 with the client-facing SSH gateway 410 is required to be established. In an example embodiment, the server-facing SSH gateway 420 may determine that the server network address 710 of the session request 725 indicates an SSH port number. Therefore, the server-facing SSH gateway 420 may determine that the session request 725 relates to the SSH session 505 of the client-facing SSH gateway 410. More specifically, the server-facing SSH gateway 420 may determine that the session request 725 is received with a predetermined VLAN identity or from a pre-determined network interface, and determine that the session request 725 relates to the SSH session 505 of the client-facing SSH gateway 410. The server-facing SSH gateway 420 may store the server network address 710 and establish the TCP session 510 with the client-facing SSH gateway 410.

The client-facing SSH gateway 410 may have a security policy 730 and may use the security policy 730 to determine whether the session request 705 is to be intercepted. The security policy 730 may include one or more filters associated with a server network, a destination network address, a source network address, a client network address, a TCP port, a link layer network address, and so forth. The client-facing SSH gateway 410 may apply the security policy 730 to the session request 705 and determine that one or more filters of the security policy 730 are satisfied and, therefore, that the session request 705 needs to be intercepted.

Figure 8:
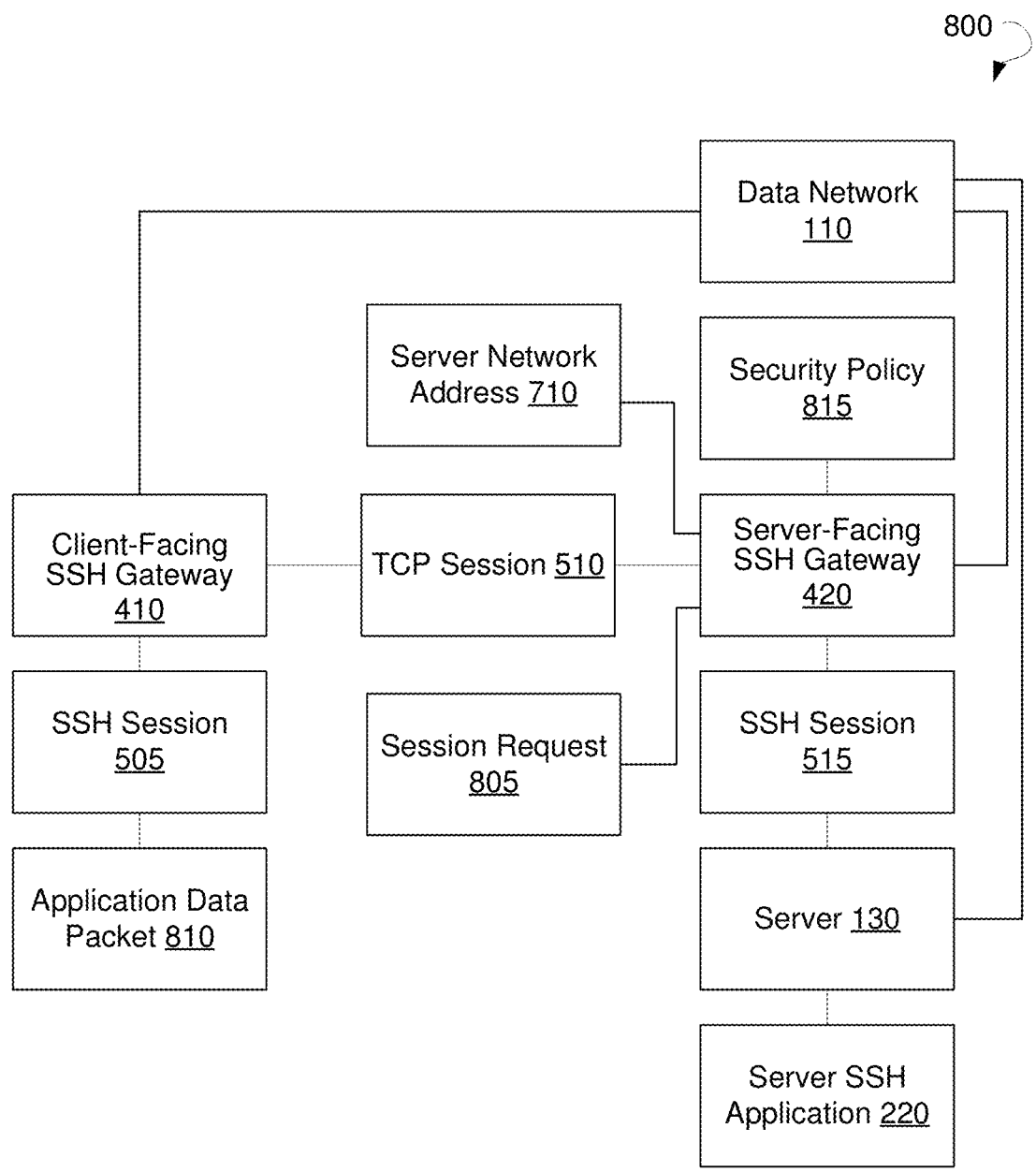
FIG. 8 is a block diagram illustrating establishing a server-side SSH session.

FIG. 8 is a block-diagram 800 illustrating establishing a server-side SSH session, according to an example embodiment. The TCP session 510 may be established between the server-facing SSH gateway 420 and the client-facing SSH gateway 410 as illustrated in FIG. 5. The server-facing SSH gateway 420 may proceed with establishing an SSH session 515 with the server 130 using the server network address 710 previously retrieved and stored during establishment of the TCP session 510. The server-facing SSH gateway 420 may send a session request 805 to the server 130 based on the server network address 710 to establish the SSH session 515. In an example embodiment, based on the session request 805 and the server network address 710 (e.g., a SSH port number of the server 130), the server 130 may determine that the server SSH application 220 is required to process the SSH session 515.

After establishment of the SSH session 505, the client-facing SSH gateway 410 may receive, from the client 120, an application data packet 810 associated with the SSH session 505. In an example embodiment, the client-facing SSH gateway 410 may establish the TCP session 510 after receiving the application data packet 810. The client-facing SSH gateway 410 may send the application data packet 810 via the TCP session 510 to the server-facing SSH gateway 420. The server-facing SSH gateway 420 may receive the application data packet 810 and process the application data packet 810. Based on the processing of the application data packet 810, the server-facing SSH gateway 420 may determine that the SSH session 515 needs to be established with the server 130.

In an example embodiment, the server-facing SSH gateway 420 may be associated with a security policy 815 and may apply the security policy 815 to the TCP session 510 to determine whether the SSH session 515 is required to be established. The security policy 815 may include one or more filters associated with a link layer identity, such as a VLAN identity, a destination network address, a destination IP address, a destination TCP port number, a source network address, a source IP address, a source TCP port number, and so forth. The server-facing SSH gateway 420 may apply the security policy 815 to the server network address 710 obtained based on the TCP session 510 to determine whether the server network address 710 matches one or more filters of the security policy 815 and whether the SSH session 515 is required to be established. The security policy 815 may include one or more content filters such as a string of characters, a word, a user identity, a URL, a data pattern, and so forth. The server-facing SSH gateway 420 may apply the security policy 815 to the application data packet 810 to determine whether the application data packet 810 matches one or more content filters. When the match is found, the server-facing SSH gateway 420 may determine that the SSH session 515 is required to be established.

Figure 9:
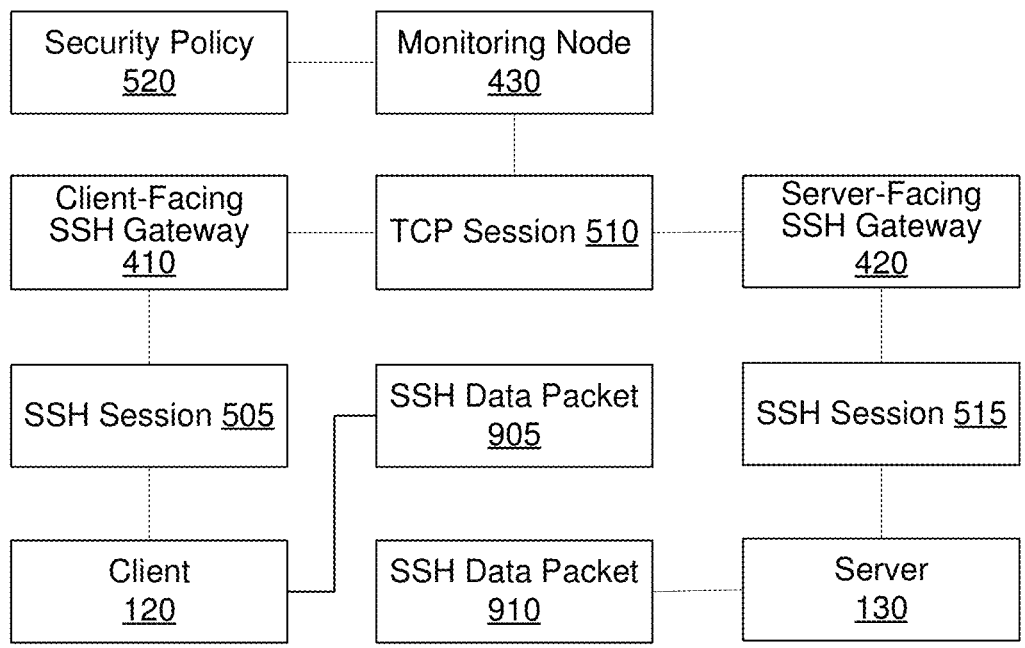
FIG. 9 is a block diagram illustrating processing data packets associated with an SSH session.

FIG. 9 is a block diagram 900 illustrating processing data packets associated with an SSH session, according to an example embodiment. The client-facing SSH gateway 410 may connect to the client 120 over the SSH session 505, and may connect to the server-facing SSH gateway 420 over the TCP session 510. The server-facing SSH gateway 420 connected to the client-facing SSH gateway 410 over the TCP session 510 may also connect to the server 130 over the SSH session 515. The TCP session 510 may be monitored by the monitoring node 430.

The client 120 may send an SSH data packet 905 using the SSH session 505. The client-facing SSH gateway 410 may receive the SSH data packet 905 over the SSH session 505 and forward the SSH data packet 905 over the TCP session 510 to the server-facing SSH gateway 420. In an example embodiment, the SSH data packet 905 may be encrypted by the client 120 using a security key associated with the SSH session 505. The client-facing SSH gateway 410 may decrypt the SSH data packet 905 using the same security key associated with the SSH session 505. Therefore, the client-facing SSH gateway 410 may send the decrypted SSH data packet 905 to the server-facing SSH gateway 420 over the TCP session 510.

In an example embodiment, the monitoring node 430 may monitor the TCP session 510 and receive the SSH data packet 905. The monitoring node 430 may have a security policy 520 and may apply the security policy 520 to inspect the SSH data packet 905. The security policy 520 may include a filter and an action so that the monitoring node 430 may apply the action of the security policy 520 upon determining that the SSH data packet 905 satisfies the filter of the security policy 520. In an example embodiment, the monitoring node 430 may modify the SSH data packet 905 prior to sending the SSH data packet 905 to the server-facing SSH gateway 420.

The server-facing SSH gateway 420 may receive the decrypted SSH data packet 905. In some embodiments, the received decrypted SSH data packet 905 may be modified by the monitoring node 430 according to the security policy 520. The server-facing SSH gateway 420 may encrypt the SSH data packet 905 using a security key associated with the SSH session 515 and send the encrypted SSH data packet 905 over the SSH session 515 to the server 130. The server 130 may receive the encrypted SSH data packet 905 over the SSH session 515 and decrypt the received encrypted SSH data packet 905 using the security key of the SSH session 515.

In a further example embodiment, the server 130 may send an SSH data packet 910 using the SSH session 515. The server-facing SSH gateway 420 may receive the SSH data packet 910 over the SSH session 515 and forward the SSH data packet 910 over the TCP session 510 to the client-facing SSH gateway 410. The SSH data packet 910 may be encrypted by the server 130 using the security key associated with SSH session 515. The server-facing SSH gateway 420 may decrypt the SSH data packet 910 based on the security key associated with the SSH session 515. The server-facing SSH gateway 420 may send the decrypted SSH data packet 910 over the TCP session 510.

In some example embodiments, the monitoring node 430 may monitor the TCP session 510 and may receive the SSH data packet 910 from the server-facing SSH gateway 420. The monitoring node 430 may apply the security policy 520 to inspect the SSH data packet 910. The monitoring node 430 may apply the action of security policy 520 upon determining that SSH data packet 910 satisfies the filter of security policy 520. In an example embodiment, the monitoring node 430 may modify the SSH data packet 910 prior to sending the SSH data packet 910 to the client-facing SSH gateway 410.

The client-facing SSH gateway 410 may receive the decrypted SSH data packet 910. The client-facing SSH gateway 410 may encrypt the SSH data packet 910 using the security key associated with the SSH session 505 and send the encrypted SSH data packet 910 over the SSH session 505 to the client 120. The client 120 may receive the encrypted SSH data packet 910 over the SSH session 505 and decrypt the received encrypted SSH data packet 910 using the security key associated with the SSH session 505.

Figure 10:
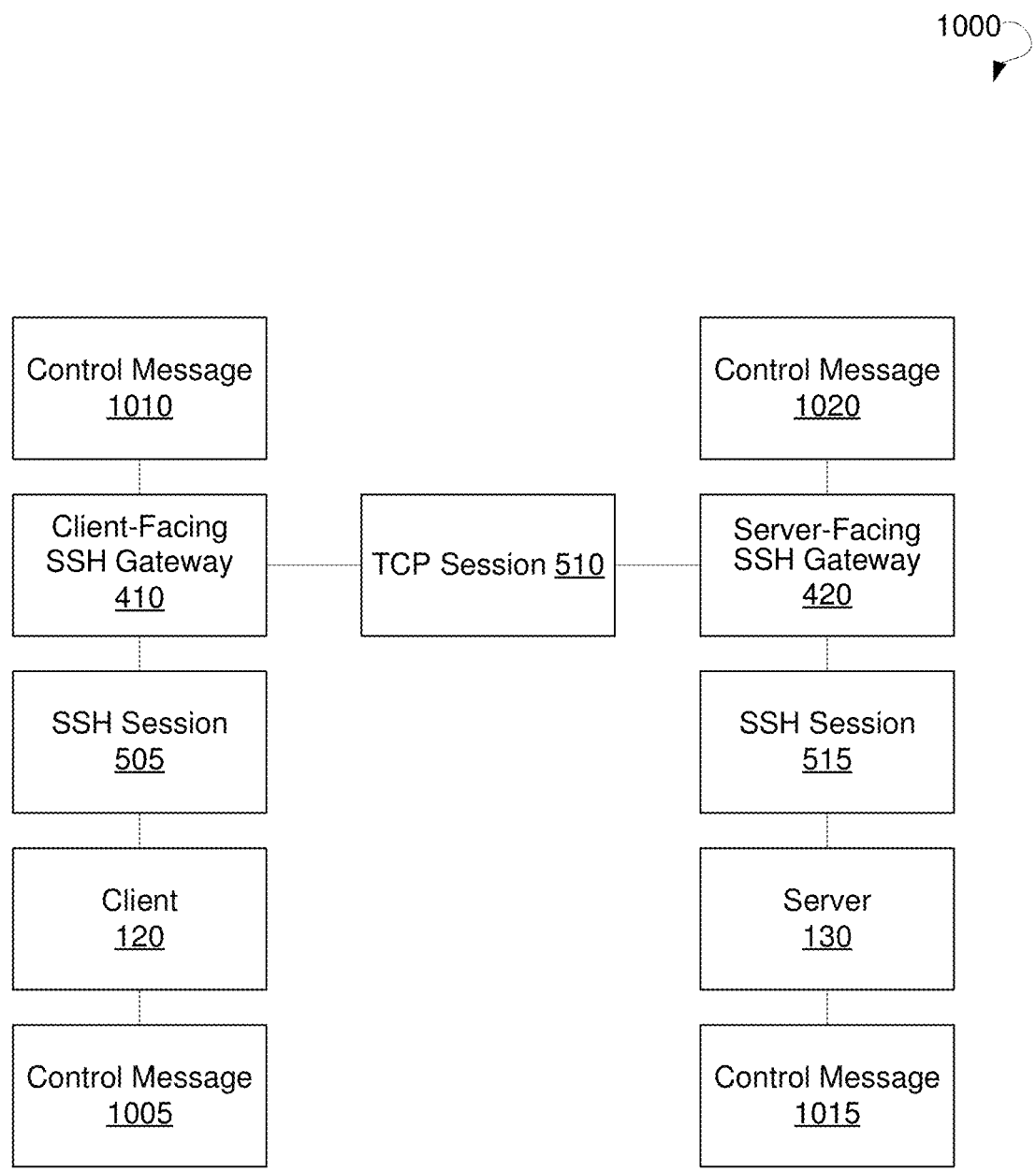
FIG. 10 is a block diagram showing processing SSH control messages.

FIG. 10 is a block diagram 1000 illustrating processing SSH control messages, according to an example embodiment. The client 120 may send a control message 1005 associated with the SSH session 505 to the client-facing SSH gateway 410. In an example embodiment, the control message 1005 may include a compressed negotiation message, an encryption algorithm exchange message, a rekey message, also referred to as a key exchange or a key re-exchange message, or any other control message. The client-facing SSH gateway 410 may receive the control message 1005 and modify and store one or more processing attributes of the SSH session 505 according to the control message 1005.

The client-facing SSH gateway 410 may generate a control message 1010 and send the control message 1010 to the client 120 via the SSH session 505. The control message 1010 may include a compressed negotiation message, a key exchange or a key re-exchange message, an encryption algorithm exchange message, or any other control message. The client-facing SSH gateway 410 may modify and store one or more processing attributes of the SSH session 505 according to the control message 1010. In an example embodiment, the client-facing SSH gateway 410 may generate the control message 1010 according to a pre-determined configuration provisioned by a network administer. In a further example embodiment, the client-facing SSH gateway 410 may generate the control message 1010 as a response to the received control message 1005.

The server 130 may send a control message 1015 for the SSH session 515 to the server-facing SSH gateway 420. The control message 1015 may include a compressed negotiation message, a key exchange or a key re-exchange message, an encryption algorithm exchange message, or any other control message. The server-facing SSH gateway 420 may receive the control message 1015 and modify and store one or more processing attributes of the SSH session 515 according to the control message 1015. The server-facing SSH gateway 420 may generate a control message 1020 and send the control message 1020 to the server 130 via the SSH session 515. The control message 1020 may include a compressed negotiation message, a key exchange or a key re-exchange message, an encryption algorithm exchange message, or any other control message. The server-facing SSH gateway 420 may modify and store one or more processing attributes of the SSH session 515 according to the control message 1020. In an example embodiment, the server-facing SSH gateway 420 may generate the control message 1020 according to a pre-determined configuration provisioned by a network administrator. In a further example embodiment, the server-facing SSH gateway 420 may generate the control message 1020 as a response to the received control message 1015.

Figure 11:
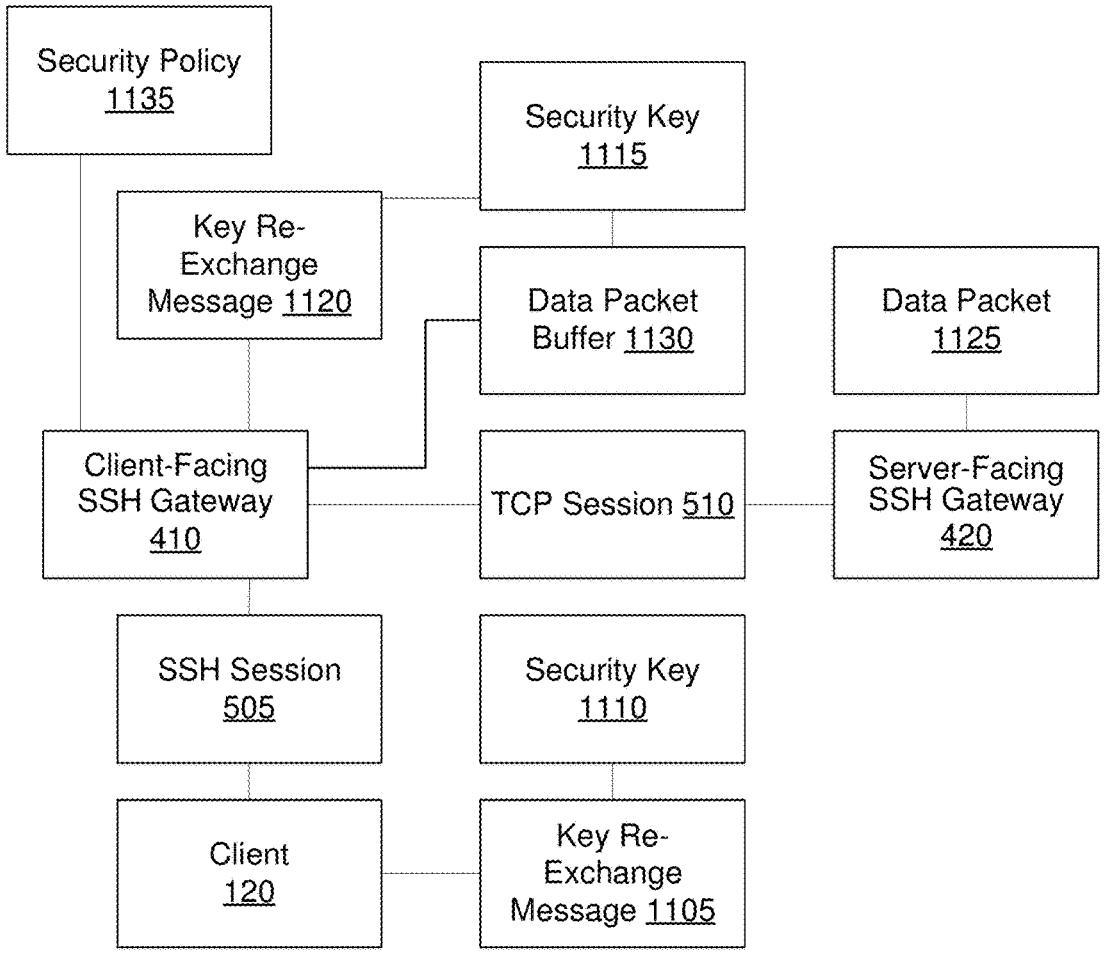
FIG. 11 is a block diagram illustrating processing an SSH key re-exchange between a client and a client-facing SSH gateway.

FIG. 11 is a block diagram 1100 illustrating processing an SSH key re-exchange between a client and a client-facing SSH gateway, according to an example embodiment. The client 120 may send a rekey message shown as a key re-exchange message 1105 for the SSH session 505 to allow the client 120 and the client-facing SSH gateway 410 to exchange a pair of security keys. The key re-exchange message 1105 may include a security key 1110 of the client 120. The client-facing SSH gateway 410 may receive the key re-exchange message 1105 from the client, retrieve the security key 1110 from key re-exchange message 1105, and store the security key 1110. In an example embodiment, the client-facing SSH gateway 410 may generate a security key 1115 or retrieve the security key 1115 from a storage node. The client-facing SSH gateway 410 may further generate a key re-exchange message 1120, include the security key 1115 into the key re-exchange message 1120, and send the key re-exchange message 1120 as a response to the key re-exchange message 1105. The key re-exchange message 1120 may be sent by the client-facing SSH gateway 410 over the SSH session 505 to the client 120.

In an example embodiment, the client-facing SSH gateway 410 may receive a data packet 1125 over the TCP session 510 from the server-facing SSH gateway 420 during the processing of the key re-exchange message 1105 and key re-exchange message 1120. The client-facing SSH gateway 410 may determine that the data packet 1125 is required to be sent to the client 120 via the SSH session 505. The client-facing SSH gateway 410 may store the data packet 1125 in a data packet buffer 1130. Upon sending the key re-exchange message 1120 over the SSH session 505 to the client 120, the client-facing SSH gateway 410 may retrieve the data packet 1125 from the data packet buffer 1130. The client-facing SSH gateway 410 may encrypt the data packet 1125 using the security key 1115 and the security key 1110 prior to sending the encrypted data packet 1125 to the client 120 over the SSH session 505.

In an example embodiment, the client-facing SSH gateway 410 may generate the security key 1115 and the key re-exchange message 1120 according to a pre-stored configuration or pre-determined schedule. The client-facing SSH gateway 410 may send the key re-exchange message 1120 over the SSH session 505 to the client 120 to negotiate or exchange a pair of security keys for the SSH session 505. Upon receiving the key re-exchange message 1120 and retrieving the security key 1115, the client 120 may send a responding key re-exchange message 1105, which may include the security key 1110. The client-facing SSH gateway 410 may receive the key re-exchange message 1105 and retrieve security key 1110 from the key re-exchange message 1105. The client-facing SSH gateway 410 may use the security key 1110 and the security key 1115 for encryption and decryption of subsequent data packets associated with the SSH session 505.

In an example embodiment, the client-facing SSH gateway 410 may receive the data packet 1125 over the TCP session 510 from the server-facing SSH gateway 420 after sending the key re-exchange message 1120. The client-facing SSH gateway 410 may store the data packet 1125 in the data packet buffer 1130. Upon receipt of the responding key re-exchange message 1105 by the client-facing SSH gateway 410, the client-facing SSH gateway 410 may retrieve the data packet 1125 from the data packet buffer 1130 and encrypt the data packet 1125 using the security key 1115 and the security key 1110. Subsequently, the client-facing SSH gateway 410 may send the encrypted data packet 1125 over the SSH session 505 to the client 120.

In an example embodiment, the client-facing SSH gateway 410 may be associated with a security policy 1135 and may send the key re-exchange message 1120 based on the security policy 1135. The security policy 1135 may include a session data capacity such as 1 Gigabyte (GB), 10 GB, 500 Megabyte (MB), and so forth. The client-facing SSH gateway 410 may determine that accumulated data packets received or transmitted over the SSH session 505 exceed session data capacity according to the security policy 1135. Based on such determination, the client-facing SSH gateway 410 may send the key re-exchange message 1120. In an example embodiment, the security policy 1135 may include a duration such as 10 minutes, 30 minutes, 1 hour, and so forth. The client-facing SSH gateway 410 may determine that the duration of the SSH session 505 exceeds the duration set according to the security policy 1135 and send the key re-exchange message 1120. In a further example embodiment, the security policy 1135 may include a session data capacity and a duration. The client-facing SSH gateway 410 may determine that usage of the SSH session 505 exceeds the session data capacity and the duration of security policy 1135 and send the key re-exchange message 1120.

Figure 12:
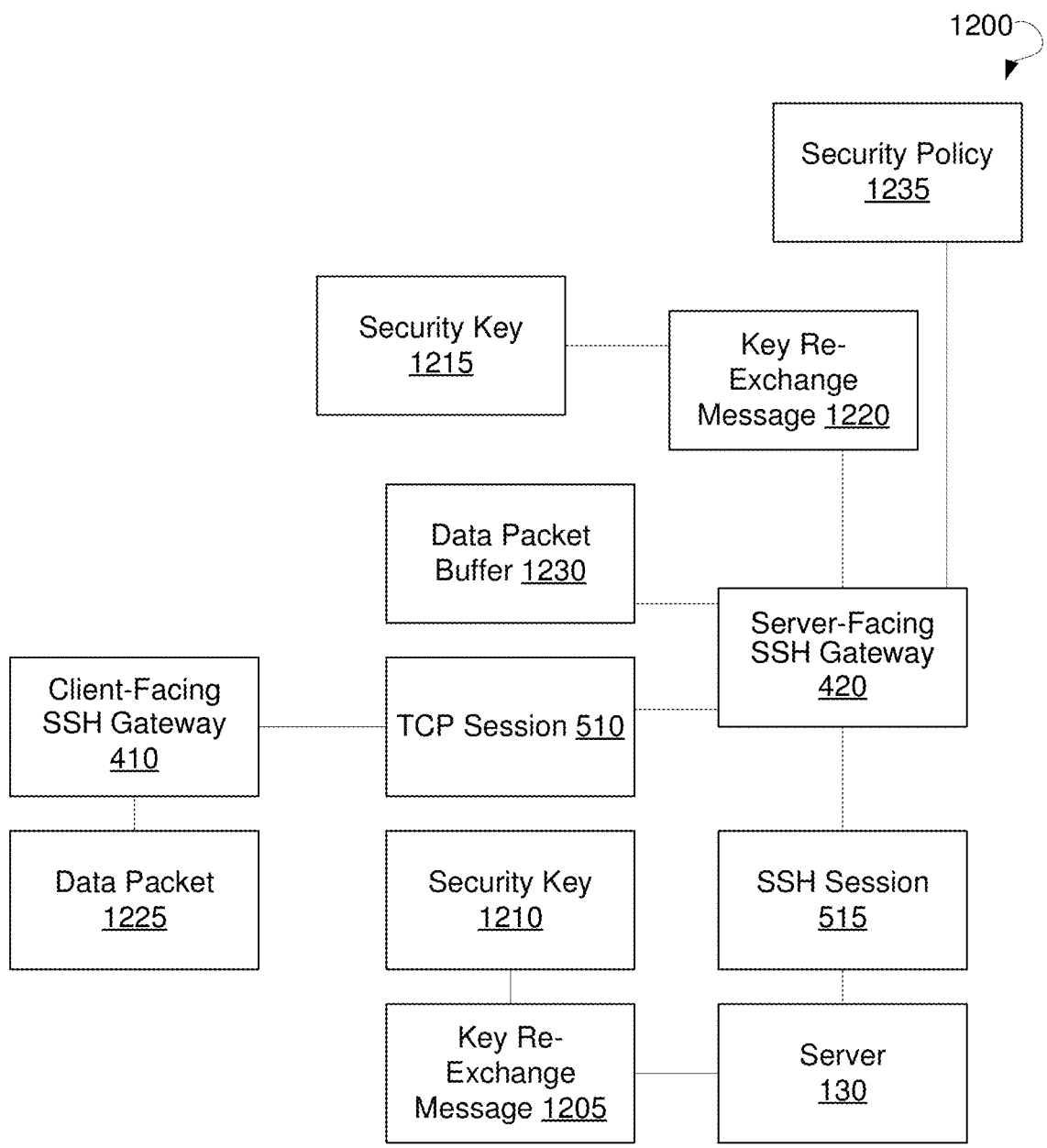
FIG. 12 is a block diagram illustrating an SSH key re-exchange between a server and a server-facing SSH gateway.

FIG. 12 is a block diagram 1200 illustrating processing an SSH key re-exchange between a server and a server-facing SSH gateway, according to an example embodiment. The server 130 may send a rekey message shown as a key re-exchange message 1205 for the SSH session 515 to allow the server 130 and the server-facing SSH gateway 420 to exchange a pair of security keys. In an example embodiment, the key re-exchange message 1205 may include a security key 1210 of server 130. The server-facing SSH gateway 420 may receive the key re-exchange message 1205, retrieve the security key 1210 from the key re-exchange message 1205, and store the security key 1210. The server-facing SSH gateway 420 may further generate a security key 1215 or retrieve the security key 1215 from a storage node, generate a key re-exchange message 1220, include the security key 1215 in the key re-exchange message 1220, and send the key re-exchange message 1220 as a response to the key re-exchange message 1205. The key re-exchange message 1220 may be sent by the server-facing SSH gateway 420 over the SSH session 515 to the server 130.

In an example embodiment, the server-facing SSH gateway 420 may receive a data packet 1225 over the TCP session 510 from the client-facing SSH gateway 410 during the processing of the key re-exchange message 1205 and the key re-exchange message 1220. Based on the determining that the data packet 1225 needs to be sent to the server 130 via the SSH session 515, the server-facing SSH gateway 420 may store the data packet 1225 in a data packet buffer 1230. Upon sending the key re-exchange message 1220 over the SSH session 515, the server-facing SSH gateway 420 may retrieve the data packet 1225 from the data packet buffer 1230 and encrypt the data packet 1225 using the security key 1215 and the security key 1110 prior to sending the encrypted data packet 1225 over the SSH session 515 to the server 130.

In an example embodiment, the server-facing SSH gateway 420 may generate the security key 1215 and the key re-exchange message 1220 according to a pre-stored configuration or pre-determined schedule. The server-facing SSH gateway 420 may send key re-exchange message 1220 over the SSH session 515 to server 130 to negotiate or exchange a pair of security keys for the SSH session 515. Upon receiving the key re-exchange message 1220 and retrieving the security key 1215, the server 130 may send the responding key re-exchange message 1205, which may include the security key 1210. The server-facing SSH gateway 420 may receive the key re-exchange message 1205 and retrieve the security key 1210 from the key re-exchange message 1205. The server-facing SSH gateway 420 may use the security key 1210 and the security key 1215 for encryption and decryption of subsequent data packets of the SSH session 515.

In an example embodiment, the server-facing SSH gateway 420 may receive a data packet 1225 over the TCP session 510 from the client-facing SSH gateway 410 after sending the key re-exchange message 1220. The server-facing SSH gateway 420 may store the data packet 1225 in the data packet buffer 1230. Upon receipt of a responding key re-exchange message 1205 by the server-facing SSH gateway 420, the server-facing SSH gateway 420 may retrieve the data packet 1225 from data packet buffer 1230 and encrypt the data packet 1225 using the security key 1215 and the security key 1210. Subsequently, the server-facing SSH gateway 420 may send the encrypted data packet 1225 over the SSH session 515 to the server 130.

In an example embodiment, the server-facing SSH gateway 420 may be associated with a security policy 1235 and may send the key re-exchange message 1220 based on the security policy 1235. The security policy 1235 may include a session data capacity, such as 1 GB, 10 GB, 500 MB, and so forth. The server-facing SSH gateway 420 may further determine that accumulated application data packets received or transmitted over the SSH session 515 exceed session data capacity of the security policy 1235, and, based on such determination, send the key re-exchange message 1220. The security policy 1235 may further include a duration of an SSH session, such as 10 minutes, 30 minutes, 1 hour, and so forth. The server-facing SSH gateway 420 may determine that the duration of the SSH session 515 exceeds the duration in the security policy 1235 and send the key re-exchange message 1220 to the server 130. In a further example embodiment, the security policy 1235 may further include a session data capacity and a duration of an SSH session. The server-facing SSH gateway 420 may determine that usage of the SSH session 515 exceeds the session data capacity and the duration of the security policy 1235, and, based on such determination, send the key re-exchange message 1220 to the server 130.

Figure 13:
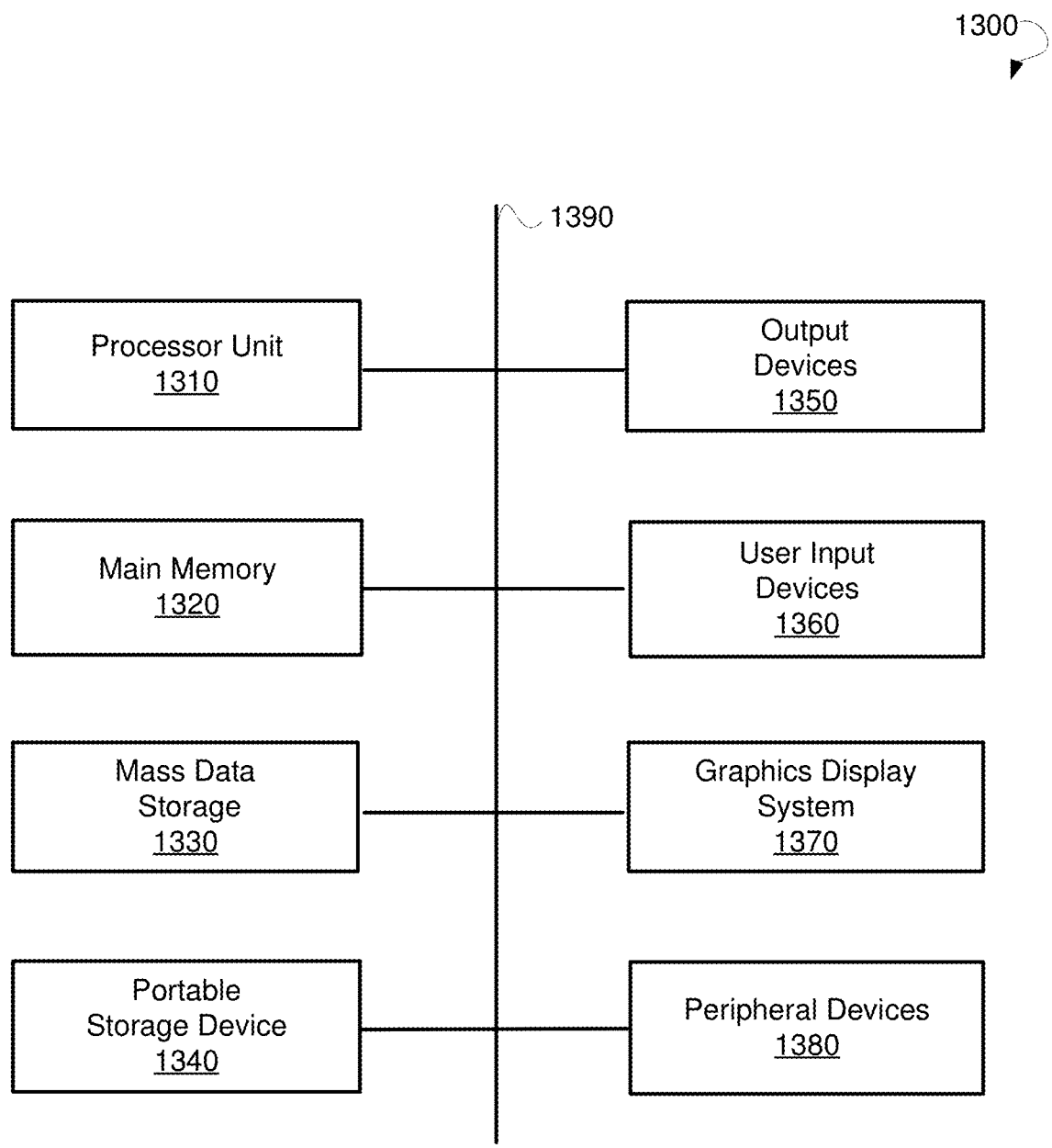
FIG. 13 shows a diagrammatic representation of a computing device for a machine, within which a set of instructions for causing the machine to perform any one or more of the methodologies discussed herein can be executed.

FIG. 13 illustrates a computer system 1300 that may be used to implement embodiments of the present disclosure, according to an example embodiment. The computer system 1300 may serve as a computing device for a machine, within which a set of instructions for causing the machine to perform any one or more of the methodologies discussed herein can be executed. The computer system 1300 can be implemented in the contexts of the likes of computing systems, networks, servers, or combinations thereof. The computer system 1300 includes one or more processor units 1310 and main memory 1320. Main memory 1320 stores, in part, instructions and data for execution by processor units 1310. Main memory 1320 stores the executable code when in operation. The computer system 1300 further includes a mass data storage 1330, a portable storage device 1340, output devices 1350, user input devices 1360, a graphics display system 1370, and peripheral devices 1380. The methods may be implemented in software that is cloud-based.

The components shown in FIG. 13 are depicted as being connected via a single bus 1390. The components may be connected through one or more data transport means. Processor units 1310 and main memory 1320 are connected via a local microprocessor bus, and mass data storage 1330, peripheral devices 1380, the portable storage device 1340, and graphics display system 1370 are connected via one or more I/O buses.

Mass data storage 1330, which can be implemented with a magnetic disk drive, solid state drive, or an optical disk drive, is a non-volatile storage device for storing data and instructions for use by processor units 1310. Mass data storage 1330 stores the system software for implementing embodiments of the present disclosure for purposes of loading that software into main memory 1320.

The portable storage device 1340 operates in conjunction with a portable non-volatile storage medium, such as a floppy disk, a CD, a DVD, or USB storage device, to input and output data and code to and from the computer system 1300. The system software for implementing embodiments of the present disclosure is stored on such a portable medium and input to the computer system 1300 via the portable storage device 1340.

User input devices 1360 provide a portion of a user interface. User input devices 1360 include one or more microphones, an alphanumeric keypad, such as a keyboard, for inputting alphanumeric and other information, or a pointing device, such as a mouse, a trackball, stylus, or cursor direction keys. User input devices 1360 can also include a touchscreen. Additionally, the computer system 1300 includes output devices 1350. Suitable output devices include speakers, printers, network interfaces, and monitors.

Graphics display system 1370 includes a liquid crystal display or other suitable display device. Graphics display system 1370 receives textual and graphical information and processes the information for output to the display device. Peripheral devices 1380 may include any type of computer support device to add additional functionality to the computer system.

The components provided in the computer system 1300 of FIG. 13 are those typically found in computer systems that may be suitable for use with embodiments of the present disclosure and are intended to represent a broad category of such computer components that are well known in the art. Thus, the computer system 1300 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 1300 may be implemented as a cloud-based computing environment, such as a virtual machine operating within a computing cloud. In other embodiments, the computer system 1300 may itself include a cloud-based computing environment, where the functionalities of the computer system 1300 are executed in a distributed fashion. Thus, the computer system 1300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1300, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for intercepting SSH sessions have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for intercepting secure shell (SSH) sessions, the system comprising:
    a client-facing SSH gateway, wherein the client-facing SSH gateway is a first hardware network device configured to:
        intercept a session request of a client, the session request including a request to establish an SSH session between the client and a server, the session request including at least a server network address associated with the server;
        responsive to the receiving the session request, generate, based on the session request, a client-side security key for the SSH session;
        provide the client-side security key to the client;
        based on the session request, establish a first SSH session between the client and the client-facing SSH gateway;
        receive, via the first SSH session, one or more data packets associated with the SSH session from the client, the one or more data packets being one or more encrypted data packets;
        decrypt the one or more encrypted data packets using the client-side security key to obtain one or more decrypted data packets;
        based on the server network address comprised in the session request, establish a communication session between the client-facing SSH gateway and a server-facing SSH gateway, wherein the communication session between the client-facing SSH gateway and the server-facing SSH gateway is an unencrypted session;
        forward the one or more decrypted data packets to a monitoring node, the monitoring node being located between the client-facing SSH gateway and the server-facing SSH gateway and configured to receive data exchanged over the unencrypted session;
        receive the one or more decrypted data packets back from the monitoring node upon inspecting the one or more decrypted data packets by the monitoring node;
        upon receiving the one or more decrypted data packets inspected by the monitoring node, forward the session request and the one or more decrypted data packets to the server-facing SSH gateway via the communication session;

determine that accumulated data packets associated with the first SSH session exceed a predetermined session data capacity;

based on the determining, generate a further client-side security key; and send a rekey message to the client, the rekey message including the further client-side security key, wherein the client-facing SSH gateway decrypts further encrypted data packets received from the client using the further client-side security key; and the server-facing SSH gateway, wherein the server-facing SSH gateway is a second hardware network device configured to:

upon establishing the communication session, generate, based on the session request, a server-side security key for the SSH session;

provide the server-side security key to the server;

based on the session request, establish, based on the server network address, a second SSH session between the server-facing SSH gateway and the server;

receive the one or more decrypted data packets from the client-facing SSH gateway via the communication session;

encrypt the one or more decrypted data packets using the server-side security key to obtain the one or more encrypted data packets; and forward the one or more encrypted data packets to the server via the second SSH session.

2. The system of claim 1, wherein the monitoring node is configured to perform one or more actions selected from a group comprising: inspecting the one or more decrypted data packets, applying a security policy to the one or more decrypted data packets, dropping at least one of the one or more decrypted data packets, replacing a data content in the one or more decrypted data packets, storing the one or more decrypted data packets, and generating a report associated with inspecting the one or more decrypted data packets.

3. The system of claim 1, wherein the communication session between the client-facing SSH gateway and the server-facing SSH gateway includes an unsecure transmission control protocol (TCP) session.

4. The system of claim 1, wherein the SSH session between the client and the server includes the first SSH session between the client and the client-facing SSH gateway, the communication session between the client-facing SSH gateway and the server-facing SSH gateway, and the second SSH session between the server-facing SSH gateway and the server.

5. The system of claim 1, wherein the intercepting of the session request is performed by the client-facing SSH gateway based on a security policy, the security policy including one or more filters for inspecting the session request, the one or more filters including one or more of the following: the server network address, a client network address, an SSH port number associated with the client, a TCP port number associated with the client, and a link layer network address.

6. The system of claim 1, wherein the server-facing SSH gateway is further configured to:

receive, from the server, via the second SSH session, one or more further data packets associated with the SSH session;

decrypt the one or more further encrypted data packets to obtain one or more further decrypted data packets;

forward the one or more further decrypted data packets to the client-facing SSH gateway via the communication session;

wherein the client-facing SSH gateway is further configured to:

receive the one or more further decrypted data packets from the server-facing SSH gateway via the communication session;

encrypt the one or more further decrypted data packets to obtain the one or more further encrypted data packets; and forward the one or more further encrypted data packets to the client via the first SSH session.

7. The system of claim 6, wherein the server-facing SSH gateway is further configured to forward the one or more further decrypted data packets to the monitoring node; and wherein the server-facing SSH gateway is further configured to receive the one or more further decrypted data packets back from the monitoring node.

8. The system of claim 1, wherein the one or more encrypted data packets are encrypted by the client using the client-side security key; and wherein the one or more encrypted data packets are decrypted by the client-facing SSH gateway using the client-side security key.

9. The system of claim 8, wherein the client-facing SSH gateway is further configured to:

receive a rekey message from the client, the rekey message including a request to generate a further client-side security key;

responsive to the receiving of the rekey message, generate the further client-side security key; and send the further client-side security key to the client, wherein further encrypted data packets received from the client are decrypted by the client-facing SSH gateway using the further client-side security key.

10. The system of claim 8, wherein the one or more decrypted data packets are encrypted by the server-facing SSH gateway using the server-side security key; and wherein the one or more encrypted data packets are decrypted by the server using the server-side security key.

11. The system of claim 10, wherein the server-facing SSH gateway is further configured to:

receive a further rekey message from the server, the further rekey message including a request to generate a further server-side security key;

wherein the client-facing SSH gateway is further configured to:

responsive to the receiving of the further rekey message, generate the further server-side security key; and send the further server-side security key to the server, wherein further encrypted data packets received from the server are decrypted by the server-facing SSH gateway using the further server-side security key.

12. A method for intercepting secure shell (SSH) sessions, the method comprising:

intercepting, by a client-facing SSH gateway, a session request of a client, the session request including a request to establish an SSH session between the client and a server, the session request including at least a server network address associated with the server;

responsive to the receiving the session request, generating, based on the session request, a client-side security key for the SSH session;

providing the client-side security key to the client;

based on the session request, establishing, by the client-facing SSH gateway, a first SSH session between the client and the client-facing SSH gateway;

receiving, by the client-facing SSH gateway, via the first SSH session, one or more data packets associated with the SSH session from the client, the one or more data packets being one or more encrypted data packets;

decrypting, by the client-facing SSH gateway, the one or more encrypted data packets using the client-side security key to obtain one or more decrypted data packets;

based on the server network address comprised in the session request, establishing, by the client-facing SSH gateway, a communication session between the client-facing SSH gateway and a server-facing SSH gateway, wherein the communication session between the client-facing SSH gateway and the server-facing SSH gateway is an unencrypted session;

forwarding, by the client-facing SSH gateway, the one or more decrypted data packets to a monitoring node, the monitoring node being located between the client-facing SSH gateway and the server-facing SSH gateway and configured to receive data exchanged over the unencrypted session;

receiving, by the client-facing SSH gateway, the one or more decrypted data packets back from the monitoring node upon inspecting the one or more decrypted data packets by the monitoring node;

upon receiving the one or more decrypted data packets inspected by the monitoring node, forwarding, by the client-facing SSH gateway, the session request and the one or more decrypted data packets to the server-facing SSH gateway via the communication session;

upon establishing the communication session, generating, by the server-facing SSH gateway, based on the session request, a server-side security key for the SSH session;

providing, by the server-facing SSH gateway, the server-side security key to the server;

based on the session request, establishing, by the server-facing SSH gateway, based on the server network address, a second SSH session between the server-facing SSH gateway and the server;

receiving, by the server-facing SSH gateway, the one or more decrypted data packets from the client-facing SSH gateway via the communication session;

encrypting, by the server-facing SSH gateway, the one or more decrypted data packets using the server-side security key to obtain the one or more encrypted data packets;

forwarding, by server-facing SSH gateway, the one or more encrypted data packets to the server via the second SSH session;

determining, by the client-facing SSH gateway, that accumulated data packets associated with the first SSH session exceed a predetermined session data capacity;

based on the determining, generating a further client-side security key; and sending, by the client-facing SSH gateway, a rekey message to the client, the rekey message including the further client-side security key, wherein the client-facing SSH gateway decrypts further encrypted data packets received from the client using the further client-side security key.

13. The method of claim 12, further comprising:
receiving, by the server-facing SSH gateway, from the server, via the second SSH session, one or more further data packets associated with the SSH session;
decrypting, by the server-facing SSH gateway, the one or more further encrypted data packets to obtain one or more further decrypted data packets;
forwarding, by the server-facing SSH gateway, the one or more further decrypted data packets to the client-facing SSH gateway via the communication session;
receiving, by the client-facing SSH gateway, the one or more further decrypted data packets from the server-facing SSH gateway via the communication session;
encrypting, by the client-facing SSH gateway, the one or more further decrypted data packets to obtain the one or more further encrypted data packets; and
forwarding, by the client-facing SSH gateway, the one or more further encrypted data packets to the client via the first SSH session.

14. The method of claim 12, wherein the one or more encrypted data packets are encrypted by the client using the client-side security key; and
wherein the one or more encrypted data packets are decrypted by the client-facing SSH gateway using the client-side security key.

15. The method of claim 14, further comprising:
receiving, by the client-facing SSH gateway, a rekey message from the client, the rekey message including a request to generate a further client-side security key;
responsive to the receiving of the rekey message, generating, by the client-facing SSH gateway, the further client-side security key; and
sending, by the client-facing SSH gateway, the further client-side security key to the client, wherein further encrypted data packets received from the client are decrypted by the client-facing SSH gateway using the further client-side security key.

16. The method of claim 14, wherein the one or more decrypted data packets are encrypted by the server-facing SSH gateway using the server-side security key and wherein the one or more encrypted data packets are decrypted by the server using the server-side security key.

17. The method of claim 16, further comprising:
receiving, by the server-facing SSH gateway, a further rekey message from the server, the further rekey message including a request to generate a further server-side security key;
responsive to the receiving of the further rekey message, generating, by the client-facing SSH gateway, the further server-side security key; and
sending, by the client-facing SSH gateway, the further server-side security key to the server, wherein further encrypted data packets received from the server are decrypted by the server-facing SSH gateway using the further server-side security key.

18. A system for intercepting secure shell (SSH) sessions, the system comprising:
a client-facing SSH gateway, wherein the client-facing SSH gateway is a first hardware network device configured to:
intercept a session request of a client, the session request including a request to establish an SSH session between the client and a server, the session request including at least a server network address associated with the server;
responsive to the receiving the session request, generate, based on the session request, a client-side security key for the SSH session;
provide the client-side security key to the client;
based on the session request, establish a first SSH session between the client and the client-facing SSH gateway;
receive, via the first SSH session, one or more data packets associated with the SSH session from the client, the one or more data packets being one or more encrypted data packets;

decrypt the one or more encrypted data packets using the client-side security key to obtain one or more decrypted data packets;

based on the server network address comprised in the session request, establish a communication session between the client-facing SSH gateway and a server-facing SSH gateway, wherein the communication session between the client-facing SSH gateway and the server-facing SSH gateway is an unencrypted session;

forward the one or more decrypted data packets to a monitoring node, the monitoring node being located between the client-facing SSH gateway and the server-facing SSH gateway and configured to receive data exchanged over the unencrypted session;

receive the one or more decrypted data packets back from the monitoring node upon inspecting the one or more decrypted data packets by the monitoring node;

upon receiving the one or more decrypted data packets inspected by the monitoring node, forward the session request and the one or more decrypted data packets to the server-facing SSH gateway via the communication session;

determine that accumulated data packets associated with the first SSH session exceed a predetermined session data capacity;

based on the determining, generate a further client-side security key; and send a rekey message to the client, the rekey message including the further client-side security key, wherein the client-facing SSH gateway decrypts further encrypted data packets received from the client using the further client-side security key;

the server-facing SSH gateway, wherein the server-facing SSH gateway is a second hardware network device configured to:

upon establishing the communication session, generate, based on the session request, a server-side security key for the SSH session;

provide the server-side security key to the server;

based on the session request, establish, based on the server network address, a second SSH session between the server-facing SSH gateway and the server;

receive the one or more decrypted data packets from the client-facing SSH gateway via the communication session;

encrypt the one or more decrypted data packets using the server-side security key to obtain the one or more encrypted data packets; and forward the one or more encrypted data packets to the server via the second SSH session; and the monitoring node in communication with the client-facing SSH gateway and the server-facing SSH gateway, the monitoring node configured to:

receive the one or more decrypted data packets from the client-facing SSH gateway via the communication session or the server-facing SSH gateway; and perform one or more actions selected from a group comprising:

inspecting the one or more decrypted data packets, applying a security policy to the one or more decrypted data packets, dropping at least one of the one or more decrypted data packets, replacing a data content in the one or more decrypted data packets, storing the one or more decrypted data packets, and generating a report associated with inspecting the one or more decrypted data packets.

* * * * *